(12) United States Patent (10) Patent No.: US 12,701,079 B2

Lam (45) Date of Patent: Aug. 4, 2026

(54) NETWORKING PROCESSOR AND NETWORK DEVICE

(71) Applicant: HUAWEI TECHNOLOGIES CO., LTD., Shenzhen (CN)

(72) Inventor: Wan Lam, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 613 days.

(21) Appl. No.: 18/310,574

(22) Filed: May 2, 2023

(65) Prior Publication Data

US 2023/0275832 A1 Aug. 31, 2023

Related U.S. Application Data

(63) Continuation of application No. PCT/CN2020/126234, filed on Nov. 3, 2020.

(51) Int. Cl.
*H04L 45/74* (2022.01)
*H04L 49/90* (2022.01)

(52) U.S. Cl.
CPC .............. *H04L 45/74* (2013.01); *H04L 49/90* (2013.01)

(58) Field of Classification Search
CPC ....... H04L 45/74; H04L 49/90; H04L 49/102; H04L 12/12
See application file for complete search history.

(56) References Cited

U.S. PATENT DOCUMENTS

| | | | |
|---|---|---|---|
| 6,421,348 B1 | 7/2002 | Gaudet et al. | |
| 6,807,175 B1 * | 10/2004 | Jennings ................. | H04L 45/16 370/392 |
| 7,254,139 B2 * | 8/2007 | Benayoun ............. | H04L 49/351 370/428 |
| 9,596,137 B1 | 3/2017 | White et al. | |

FOREIGN PATENT DOCUMENTS

| | | | |
|---|---|---|---|
| CN | 1187077 A | 7/1998 | |
| CN | 211062041 U | 7/2020 | |
| WO | WO-02056526 A2 * | 7/2002 | ......... H04L 41/0896 |

OTHER PUBLICATIONS

International Search Report and Written Opinion issued in PCT/CN2020/126234, dated Jul. 28, 2021, 8 pages.
Extended European Search Report issued in EP20960234.1, dated Oct. 26, 2023, 9 pages.

* cited by examiner

*Primary Examiner* — Charles C Jiang
*Assistant Examiner* — Rachel Elizabeth Marks

(57) ABSTRACT

A networking processor is disclosed. The networking processor comprises a plurality of ports, a plurality of buses and a plurality of switch units. The switch unit is bound to at least one of the plurality of ports, and is configured to receive data from outside of the networking processor and send the data to the outside of the networking processor through the bound port. Each of the plurality of buses is bound to at least two of the plurality of switch units, each of the plurality of switch units is bound to at least one of the plurality of buses, and the switch unit forwards the data between different switch units through a network formed by the plurality of buses. In this way, latency of data switching is reduced.

13 Claims, 9 Drawing Sheets

NETWORKING PROCESSOR AND NETWORK DEVICE

CROSS-REFERENCE TO RELATED APPLICATIONS

This application is a continuation of International Application No. PCT/CN2020/126234, filed on Nov. 3, 2020, the disclosure of which is hereby incorporated by reference in its entirety.

TECHNICAL FIELD

The present disclosure relates to the field of communication technologies, and specifically, to a networking processor and a network device.

BACKGROUND

A networking processor (NP) is a microprocessor that is used in a communication network and configured to provide logic for sending and receiving data. The NP is a programmable device that is specifically used in various tasks in the communication field, such as packet processing, protocol analysis, route lookup, voice/data aggregation, and firewall. The networking processor includes a plurality of ports arranged on a periphery of the networking processor and a switch arranged at a middle position of the networking processor. A principle of data switching between the ports in the networking processor is: The networking processor receives data from outside of the networking processor through a port, and the data is outputted from another port only after being switched by the switch located at the middle position of the networking processor.

It is clear that data to be switched between any ports needs to pass through the switch located at the middle position, thereby increasing workload of the switch and prolonging switching latency of the data.

SUMMARY

The present disclosure provides a networking processor and a network device, to resolve a problem of long switching latency of data in the networking processor.

According to a first aspect, the present disclosure provides a networking processor. The networking processor is provided with a plurality of ports, and the networking processor further includes a plurality of buses and a plurality of switch units. The switch unit is bound to at least one of the ports, and is configured to receive data from outside of the networking processor and send the data to the outside of the networking processor through the bound port. Each of the plurality of buses is bound to at least two of the switch units, each of the switch units is bound to at least one of the plurality of buses, and the switch unit forwards the data between different switch units through a network formed by the plurality of buses.

Because the switch unit in the networking processor forwards the data between different switch units through the network formed by the plurality of buses, when the data is switched between the ports on the networking processor, data switching between the ports can be implemented through forwarding data by the switch unit in the networking processor. In addition, compared with the conventional technology in which all data is forwarded by a switch in a processor, each switch unit needs to forward only data received by the switch unit, thereby distributing data received by the networking processor, improving switching efficiency of the data, and reducing switching latency of the data in the networking processor. Because the switch units forward the data between each other through the buses, transmission efficiency of the data in the networking processor is improved, and forwarding latency of the data is further reduced. In a case of data self-sending and self-receiving by a port, the data can be switched in a switch unit bound to the port without participation of another switch unit. In addition, compared with the related technology, the data does not need to reach a middle position of the networking processor for being switched, thereby further reducing the switching latency of the data in the networking processor. In addition, because the networking processor includes the plurality of switch units, and each switch unit has a same structure, a design of a networking processor with different bandwidths can be completed by developing only one switch unit and multiplexing the switch unit, thereby reducing design difficulties and workload. Because the plurality of switch units included in the networking processor are connected through the buses, and structures of the switch units are the same, difficulties in top routing and connection are reduced. Because the switch units have the same structure, processing complexity of the switch units is the same. In this way, a hotspot on the networking processor can be avoided to some extent, and design difficulties in power supply and heat dissipation are reduced. Because the networking processor includes the plurality of switch units, and the switch units are interconnected through the buses, a plurality of networking processors may be interconnected through buses, to coordinate processing procedures between different networking processors, and no additional interconnection protocol needs to be defined.

In a possible implementation, the switch unit includes a switch and an access controller. The access controller is configured to obtain a data packet carrying the data from the outside of the networking processor and send the data packet carrying the data to the outside of the networking processor through a port bound to the switch unit to which the access controller belongs. The switch is configured to: obtain the data packet carrying the data from the access controller or the bus; obtain a destination address from the data packet; determine a send port in the plurality of ports based on the destination address; determine a destination unit based on the send port; determine a next transferring unit in the plurality of switch units based on the destination unit; and forward the data packet to the next transferring unit through the bus, so that the next transferring unit continues to determine a next transferring unit and forwards the data packet before the data carried in the data packet is forwarded to the destination unit.

In a possible implementation, the switch unit includes a switch and an access controller. The access controller is configured to obtain a data packet carrying the data from the outside of the networking processor and send the data packet carrying the data to the outside of the networking processor through a port bound to the switch unit to which the access controller belongs. When the switch obtains the data packet from the access controller, the switch is configured to: obtain a destination address from the data packet; determine a send port based on the destination address; determine a destination unit based on the send port; determine, based on the destination unit, path information for forwarding the data to the destination unit; and send the data and the path information to a transferring unit based on the path information through the bus, so that the transferring unit continues to forward the data and the path information based on the path information before the data is forwarded to the destination unit. When the switch obtains, from the bus, the data and the path information that are forwarded by another switch unit or the transferring unit, the switch is configured to continue to forward the data and the path information based on the path information before the data is forwarded to the destination unit. The path information indicates information about the transferring unit through which the data is forwarded to the destination unit, and the transferring unit is a switch unit that is in the plurality of switch units and that is configured to forward the data.

In a possible implementation, the switch unit includes a switch, an access controller, and a packet processor. The access controller is configured to obtain a data packet carrying the data from the outside of the networking processor and send the data packet carrying the data to the outside of the networking processor through a port bound to the switch unit to which the access controller belongs. The packet processor is configured to: obtain the data packet from the access controller or from the bus through the switch; obtain a destination address from the data packet; determine a send port in the plurality of ports based on the destination address; determine a destination unit based on the send port; and determine information about a next transferring unit based on the destination unit. The switch is configured to obtain the data packet and the information about the next transferring unit from the packet processor, and transmit the data packet to the next transferring unit based on the information about the next transferring unit through the bus, so that the next transferring unit continues to determine a next transferring unit and forwards the data packet before the data carried in the data packet is forwarded to the destination unit.

In a possible implementation, the switch unit includes a switch, an access controller, and a packet processor. The access controller is configured to obtain a data packet carrying the data from the outside of the networking processor and send the data packet carrying the data to the outside of the networking processor through a port bound to the switch unit to which the access controller belongs. The packet processor is configured to: obtain the data packet from the access controller; obtain a destination address from the data packet; determine a send port in the plurality of ports based on the destination address; determine a destination unit based on the send port; and determine, based on the destination unit, path information for forwarding the data to the destination unit. When the switch obtains the path information and the data from the packet processor, the switch is configured to send the data and the path information to a transferring unit based on the path information through the bus, so that the transferring unit continues to forward the data and the path information based on the path information before the data is forwarded to the destination unit. When the switch obtains, from the bus, the data and the path information that are forwarded by another switch unit or the transferring unit, the switch is configured to continue to forward the data and the path information based on the path information before the data is forwarded to the destination unit. The path information indicates information about the transferring unit through which the data is forwarded to the destination unit, and the transferring unit is a switch unit that is in the plurality of switch units and that is configured to forward the data.

In a possible implementation, the switch unit is further configured to share packet processors in different switch units through the network formed by the plurality of buses.

In a possible implementation, the switch unit further includes a traffic manager and/or a first buffer. The traffic manager is configured to write the data into a corresponding queue based on an attribute of the data, and schedule the data in the queue. The first buffer is configured to buffer the data. The switch is further configured to forward the data based on scheduling information of the traffic manager for the data.

In a possible implementation, the switch unit is further configured to share first buffers in different switch units through the network formed by the plurality of buses.

In a possible implementation, the traffic manager in the switch unit is further configured to obtain, through the network formed by the plurality of buses, a data transmission scheduling request sent by another switch unit, and generate scheduling response information, so that the another switch unit schedules the data based on the scheduling response information.

In a possible implementation, the networking processor further includes a second buffer and/or a forwarding table.

Both the second buffer and the forwarding table are connected to the switch unit through the bus.

The second buffer is configured to buffer data obtained by the switch unit.

The forwarding table indicates port information used during communication between the networking processors.

According to a second aspect, the present disclosure provides a network device, including at least one networking processor according to any one of the first aspect. The at least one networking processor is interconnected through a bus.

DESCRIPTION OF EMBODIMENTS

The following describes technical solutions of the present disclosure with reference to accompanying drawings.

To make the objectives, technical solutions, and advantages of the present disclosure clearer, the following clearly and describes the technical solutions in the present disclosure with reference to the accompanying drawings in the present disclosure. It is clear that, the described embodiments are merely some rather than all of embodiments of the present disclosure. All other embodiments obtained by persons of ordinary skill in the art based on embodiments of the present disclosure without creative efforts shall fall within the protection scope of the present disclosure.

In the specification, embodiments, claims, and accompanying drawings of the present disclosure, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in the present disclosure, "at least one (item)" refers to one or more and "a plurality of" refers to two or more. The term "and/or" is used for describing an association relationship between associated objects, and represents that three relationships may exist. For example, "A and/or B" may represent any one of the following three cases: Only A exists, only B exists, or both A and B exist, where A and B may be singular or plural. A character "/" generally indicates an "or" relationship between the associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

First, a structure of a networking processor in the related technology is described.

Figure 1:
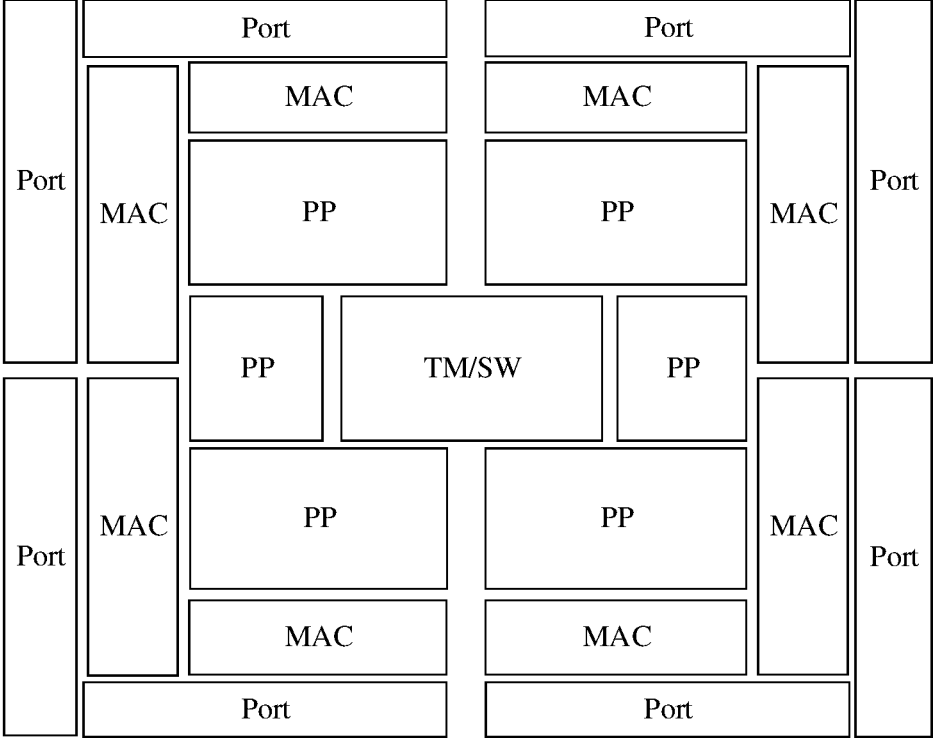
FIG. 1 is a schematic diagram of a structure of a networking processor provided in the related technology.

FIG. 1 is a schematic diagram of a structure of the networking processor provided in the related technology. As shown in FIG. 1, the networking processor includes a plurality of ports, a plurality of media access controllers (Access controller, MAC), a plurality of packet processors (PP), a traffic manager (TM), and a switch (SW).

The TM and the SW are located at a middle position of the networking processor, the plurality of PPs is distributed around the TM and the SW, the plurality of MACs is distributed around the plurality of PPs, and the plurality of ports is distributed around the plurality of MACs. It is clear that each part of the networking processor is centered on the TM and the SW, and spreads around. In addition, each MAC is bound to at least one port, and each PP is bound to at least one MAC.

The following describes function of each part in the networking processor.

The port is mainly configured to provide the networking processor with a high-speed interface for a signal, for example, a 50 Gbps high-speed electrical serial interface (SerDes) or an optical interface Optical I/O. The networking processor receives data from outside of the networking processor or the sends data to the outside of the networking processor through the port.

The media access controller is configured to provide an interface of a standard protocol, and perform verification (for example, verification on data integrity and correctness), frame delimitation, receiving and sending, encapsulation, and the like on the data according to a standard protocol.

The packet processor is configured to perform processing such as protocol analysis and searching for a send port on a received data packet.

The traffic manager is configured to write the data into a corresponding queue based on an attribute of the data, the send port, and the like; and schedule, according to a specific QoS policy, the data written into the queue.

The switch is configured to switch the data to the send port.

The following describes a principle of data switching between the ports in the networking processor in the related technology.

The networking processor receives the data from a receive port, and the data arrives at the TM and the SW after being sequentially processed by a receive side of a first MAC and a receive side of a first PP. The TM writes the data into the corresponding queue based on the attribute of the data, and schedules the data in the queue. The SW switches the data to a second PP based on scheduling information about the TM, and the data is outputted by the send port after being sequentially processed by a send side of the second first PP and a send side of a second MAC. It should be noted that, the send port is a port in the plurality of ports that sends the data to the outside of the networking processor, and the receive port is a port in the plurality of ports that receives the data from the outside of the networking processor.

The first MAC is a MAC bound to the receive port in the networking processor, the first PP is a PP bound to the first MAC in the networking processor, the second MAC is a MAC bound to the send port in the networking processor, and the second PP is a PP bound to the second MAC in the networking processor. It should be noted that the receive port and the send port may be the same or may be different.

It is clear that data to be switched between any ports in the networking processor needs to pass through the SW located at the middle position of the networking processor, increasing workload of the SW and prolonging switching latency of the data. In addition, because the SW is located at the middle of the networking processor, the data switching between the ports can be completed only when the data reaches the SW located at the central position of the networking processor. Even if in a case of data self-sending and self-receiving by a port, the data needs to pass through the SW at the middle position of the networking processor. As a result, transmission time of the data in the networking processor is prolonged, and the switching latency of the data is further prolonged. In addition, because the foregoing parts are first independently developed and then integrated together, increasing difficulties in top routing and connection of the parts. In addition, because processing complexity of each part on the data is different, power consumption of each part is different, resulting in a hotspot in the networking processor, and increasing design difficulties in power supply and heat dissipation. In addition, when a plurality of networking processors is interconnected, an additional interconnection protocol needs to be defined to coordinate processing procedures between parts in different networking processors.

It should be noted that, the packet processor and the traffic manager in the networking processor are optional options, to be specific, whether to arrange the packet processor and the traffic manager in the networking processor may be determined based on a function of the networking processor. In addition, when the networking processor does not include the packet processor and the traffic manager, descriptions of functions of the foregoing parts in the networking processor are also correspondingly adjusted.

To resolve the foregoing problem, an embodiment of the present disclosure provides a networking processor. The networking processor is provided with a plurality of ports, and the networking processor further includes a plurality of buses and a plurality of switch units. The switch unit is bound to at least one of the ports, and is configured to receive data from outside of the networking processor and send the data to the outside of the networking processor through the bound port. Each of the plurality of buses is bound to at least two of the switch units, each of the switch units is bound to at least one of the plurality of buses, and the switch unit forwards the data between different switch units through a network formed by the plurality of buses. There is no intersection point between the plurality of buses.

The following describes the switch unit, the plurality of buses, and the plurality of ports.

The plurality of switch units may be arranged, for example, in an array, and an array arrangement may be a rectangular array arrangement, a circular array arrangement, or the like. This is not specifically limited in the present disclosure.

A quantity of the switch units and a bandwidth of each switch unit may be set based on a bandwidth of the networking processor. For example, if the bandwidth of the networking processor is 14.4 Tbps, the quantity of the switch units may be nine, and the bandwidth of each switch unit is 1.6 Tbps. For another example, if the bandwidth of the networking processor is 24 Tbps, the quantity of the switch units may be eight, and the bandwidth of each switch unit is 3 Tbps.

It should be noted that, bandwidths of the switch units may be the same or may be different. This is not specifically limited in this embodiment.

A quantity of the ports bound to the switch unit and a bandwidth of each port may be determined based on a bandwidth of the switch unit. For example, if the bandwidth of the switch unit is 1.6 Tbps, the quantity of the ports may be eight, and the bandwidth of each port is 0.2 Tbps. For another example, if the bandwidth of the switch unit is 1.2 Tbps, the quantity of the ports may be four, and the bandwidth of each port is 0.3 Tbps.

It should be noted that, the quantity of the ports corresponding to the switch units may be the same or may be different, and the bandwidths of the ports may be the same or may be different. This is not specifically limited in the present disclosure.

The port is mainly configured to provide the networking processor with a high-speed interface for a signal, for example, a 50 Gbps high-speed electrical serial interface (SerDes) or an optical interface Optical I/O.

A port position may be arranged in the following two manners:

In a first manner, the plurality of ports is distributed around the plurality of switch units.

In a second manner, each port is arranged in a switch unit bound to the port.

A deployment manner of the plurality of buses may be, for example, a non-blocking deployment manner or a re-arrangeable non-blocking deployment manner. Each bus may include a plurality of physical buses to provide a bandwidth large enough.

A principle of data switching between the ports on the networking processor is as follows:

A receive port receives the data from the outside of the networking processor, and forwards the received data to a switch unit bound to the receive port. The switch unit forwards the data to a transferring unit through a bus bound to the switch unit, so that the transferring unit continues to forward the data through a bus bound to the transferring unit before the data is forwarded to a switch unit bound to a send port, and the switch unit bound to the send port sends the received data to the outside of the networking processor through the send port. The send port is a port in the plurality of ports that sends the data to the outside of the networking processor, and the receive port is a port in the plurality of ports that receives the data from the outside of the networking processor. The transferring unit is a switch unit configured to transfer the data when the data is switched between the switch unit bound to the receive port and the switch unit bound to the send port.

The switch unit bound to the receive port, each transferring unit, and the switch unit bound to the send port in the networking processor form a transmission path of the data in the networking processor. There is a plurality of paths of the data in the networking processor, and a final transmission path of the data in the networking processor is one of the plurality of paths. Specifically, a routed rule may be set, and the transmission path of the data is determined according to the routed rule. For example, to shorten a transmission latency of the data in the networking processor and balance load on different paths, when the transmission path of the data is determined, a path with low load is selected based on load of each path.

The transmission path of the data is determined by the switch unit bound to the receive port, or is determined by the switch unit bound to the receive port, each transferring unit, and the switch unit bound to the send port jointly.

In other words, if the transmission path is determined by the switch unit bound to the receive port, the switch unit bound to the receive port needs to determine information about the transferring unit and an identifier of the switch unit bound to the send port. The information about the transferring units includes an identifier of the transferring unit, a sequence between the transferring units, and path information generated based on the foregoing information. In this way, each transferring unit can switch the data from the switch unit bound to the receive port to the switch unit bound to the send port based on the path information.

If the transmission path is determined by the switch unit bound to the receive port, each transferring unit, and the switch unit bound to the send port jointly, the switch unit bound to the receive port first determines information about a transferring unit adjacent to the switch unit, and then the determined transferring unit determines information about a transferring unit that is adjacent to the transferring unit and located behind the transferring unit in a transmission direction of the data, that is, a preceding unit in the transmission path needs to determine only a unit that is adjacent to the unit and located behind the unit. In this way, the switch unit bound to the receive port and each transferring unit can switch send, based on the information about the transferring unit determined by the switch unit bound to the receive port and each transferring unit, the data from the switch unit bound to the receive port to the switch unit bound to the send port. It should be noted that, the switch unit bound to the send port needs to be used when the transferring unit is determined.

It should be noted that, a quantity of the transferring units may be zero, or may be one or more. This is not specifically limited herein.

It can be learned from the foregoing that, because the switch unit in the networking processor forwards the data between different switch units through the network formed by the plurality of buses, when the data is switched between the ports on the networking processor, data switching between the ports can be implemented through forwarding data by the switch unit in the networking processor. In addition, compared with the conventional technology in which all data is forwarded by a switch in a processor, each switch unit needs to forward only data received by the switch unit, thereby distributing data received by the networking processor, improving switching efficiency of the data, and reducing switching latency of the data in the networking processor. Because the switch units forward the data between each other through the buses, transmission efficiency of the data in the networking processor is improved, and forwarding latency of the data is further reduced. In a case of data self-sending and self-receiving by a port, the data can be switched in a switch unit bound to the port without participation of another switch unit. In addition, compared with the related technology, the data does not need to reach a middle position of the networking processor for being switched, thereby further reducing the switching latency of the data in the networking processor. In addition, because the networking processor includes the plurality of switch units, and each switch unit has a same structure, a design of a networking processor with different bandwidths can be completed by developing only one switch unit and multiplexing the switch unit, thereby reducing design difficulties and workload. Because the plurality of switch units included in the networking processor are connected through the buses, and structures of the switch units are the same, difficulties in top routing and connection are reduced. Because the switch units have the same structure, processing complexity of the switch units is the same. In this way, a hotspot on the networking processor can be avoided to some extent, and design difficulties in power supply and heat dissipation are reduced. Because the networking processor includes the plurality of switch units, and the switch units are interconnected through the buses, a plurality of networking processors may be interconnected through buses, to coordinate processing procedures between different networking processors, and no additional interconnection protocol needs to be defined.

The following describes an internal structure of the switch unit.

In a possible implementation, the switch unit includes a switch and an access controller.

Because principles of determining the transmission path of the data are different, there may be some changes in the operating principle of the switch in the switch unit. Therefore, the operating principles of the switch and the access controller in the switch unit are separately described based on different principles of determining the transmission path.

It can be learned from the foregoing that, there are two principles of determining the transmission path of the data. A first principle is determined by the switch unit bound to the receive port, each transferring unit, and the switch unit bound to the send port jointly, and a second principle is determined by the switch unit bound to the receive port. The following separately describes the operating principles of the switch and the access controller based on the foregoing two principles of determining the transmission path.

If the transmission path of the data is determined in the first manner:

The access controller is configured to obtain a data packet carrying the data from the outside of the networking processor and send the data packet carrying the data to the outside of the networking processor through a port bound to the switch unit to which the access controller belongs. The switch is configured to: obtain the data packet carrying the data from the access controller or the bus; obtain a destination address from the data packet; determine a send port in the plurality of ports based on the destination address; determine a destination unit based on the send port; determine a next transferring unit in the plurality of switch units based on the destination unit; and forward the data packet to the next transferring unit through the bus, so that the next transferring unit continues to determine a next transferring unit and forwards the data packet before the data carried in the data packet is forwarded to the destination unit. The destination unit is a switch unit that is in the plurality of switch units and that is bound to the send port.

It should be noted that, if the switch unit is the switch unit bound to the receive port, the switch obtains the data packet from the access controller. If the switch unit is a transferring unit, the switch obtains the data packet from the bus. The data packet is a data packet sent by a switch unit that is preceding the switch unit and adjacent to the switch unit in the transmission path (that is, the switch unit bound to the receive port or another transferring unit) through the bus.

It should be noted that, the switch unit may alternatively serve as both a transferring unit and the switch unit bound to the receive port, and data forwarded by the switch unit as the transferring unit is different from data forwarded by the switch unit as the switch unit bound to the receive port. That is, a switch unit may forward data received from a port bound to the switch unit, and may also forward data received from a port bound to another switch unit.

After obtaining the data packet carrying the data, the access controller may further perform validation (for example, validation on data integrity and correctness), frame delimitation, encapsulation, and the like on the data through a standard protocol. The access controller is, for example, but is not limited to, a media access controller. This is not specifically limited in the present disclosure.

Based on this, a principle of data switching between the ports on the networking processor is as follows:

The receive port receives the data packet carrying the data from the outside of the networking processor, and sends the data packet to the switch unit bound to the receive port. The access controller in the switch unit obtains the data packet, and transmits the data packet to the switch in the switch unit. The switch determines a next transferring unit based on the destination address carried in the data packet and with reference to the foregoing principle, and sends the data packet to the next transferring unit through the bus. A switch in the next transferring unit receives the data packet from the bus, determines a next transferring unit (that is, a next transferring unit corresponding to the next transferring unit) based on the destination address carried in the data packet and with reference to the foregoing principle, and forwards the data packet through the bus before the data carried in the data packet is forwarded to the destination unit. A switch in the destination unit sends the data to the outside of the networking processor through the send port. Specifically, the switch in the destination unit sends the data to an access controller in the destination unit, so that the access controller encapsulates the data and sends the data from the send port.

If the transmission path of the data is determined in the second manner:

The access controller is configured to obtain a data packet carrying the data from the outside of the networking processor and send the data packet carrying the data to the outside of the networking processor through a port bound to the switch unit to which the access controller belongs. When the switch obtains the data packet from the access controller, that is, the switch unit is the switch unit bound to the receive port, the switch is configured to: obtain a destination address from the data packet; determine a send port based on the destination address; determine a destination unit based on the send port; determine, based on the destination unit, path information for forwarding the data to the destination unit; and send the data and the path information to a transferring unit based on the path information through the bus, so that the transferring unit continues to forward the data and the path information based on the path information before the data is forwarded to the destination unit. When the switch obtains, from the bus, the data and the path information that are forwarded by another switch unit (that is, the switch unit bound to the receive port) or the transferring unit, that is, the switch unit is the transferring unit, the switch is configured to continue to forward the data and the path information based on the path information before the data is forwarded to the destination unit. The path information indicates information about the transferring unit through which the data is forwarded to the destination unit, and the transferring unit is a switch unit that is in the plurality of switch units and that is configured to forward the data. The information about the transferring unit indicates an identifier of the transferring unit and a sequence between the transferring units.

The access controller is described above, and details are not described herein again.

Based on this, a principle of data switching between the ports on the networking processor is as follows:

The receive port receives the data packet carrying the data from the outside of the networking processor, and sends the data packet to the switch unit bound to the receive port. The access controller in the switch unit obtains the data packet, and transmits the data packet to the switch in the switch unit. The switch determines the path information based on the destination address carried in the data packet and with reference to the foregoing principle, and sends the data and the path information to the transferring unit adjacent to the switch unit based on the path information through the bus. A switch in the transferring unit receives the path information and the data, and continues to forward the data and the path information to a next transferring unit based on the path information before the data is forwarded to the destination unit. A switch in the destination unit receives the data and sends the data to the outside of the networking processor through the send port. Specifically, the switch in the destination unit sends the data to an access controller in the destination unit, so that the access controller encapsulates the data and sends the data from the send port.

In another possible implementation, the switch unit includes a switch, an access controller, and a packet processor.

Because principles of determining the transmission path of the data are different, there may be some changes in operating principles of the switch and the packet processor in the switch unit. Therefore, operating principles of the switch, the access controller, and the packet processor in the switch unit are separately described based on different principles of determining the transmission path.

Based on the foregoing description of the principles of determining the transmission path of the data, if the transmission path of the data is determined in the first manner:

The access controller is configured to obtain a data packet carrying the data from the outside of the networking processor and send the data packet carrying the data to the outside of the networking processor through a port bound to the switch unit to which the access controller belongs. The packet processor is configured to: obtain the data packet from the access controller or from the bus through the switch; obtain a destination address from the data packet; determine a send port in the plurality of ports based on the destination address; determine a destination unit based on the send port; and determine information about a next transferring unit based on the destination unit. The switch is configured to obtain the data packet and the information about the next transferring unit from the packet processor, and transmit the data packet to the next transferring unit based on the information about the next transferring unit through the bus, so that the next transferring unit continues to determine a next transferring unit and forwards the data packet before the data carried in the data packet is forwarded to the destination unit.

It should be noted that, if the switch unit is the switch unit bound to the receive port, the packet processor obtains the data packet from a media access controller in the switch unit. If the switch unit is a transferring unit, the packet processor obtains the data packet from the bus through the switch in the switch unit. The data packet is a data packet sent by a switch unit that is preceding the switch unit and adjacent to the switch unit in the transmission path (that is, the switch unit bound to the receive port or another transferring unit) through the bus.

The access controller is described above, and details are not described herein again.

In a possible implementation, the packet processor includes a packet processor on a receive side and a packet processor on a sending side. The packet processor on the receive side is configured to complete a data packet processing procedure of the receive side, and the packet processor on the sending side is configured to complete a data packet processing procedure of the sending side.

For example, the packet processor includes multi-level Match/Action (MA) units, and each level of MA can complete a specific data packet processing process based on software pre-developed by a user. The more levels of the MA, the more complex functions supported by the PP. A quantity of levels of MA included in a packet processor in the switch units may be the same or may be different. This is not specifically limited in this embodiment. It should be noted that, a structure of the foregoing packet processor is merely an example, and is not intended to limit the present disclosure.

Based on this, a principle of data switching between the ports on the networking processor is as follows:

The receive port receives the data packet carrying the data from the outside of the networking processor, and sends the data packet to the switch unit bound to the receive port. The access controller in the switch unit obtains the data packet, and sends the data packet to the packet processor in the switch unit. The packet processor determines the information about a next transferring unit based on the destination address in the data packet and with reference to the foregoing principle, and sends the information about the next transferring unit and the data packet to the switch in the switch unit. The switch forwards the data packet to the next transferring unit based on the information about the next transferring unit through the bus. The information about the next transferring unit indicates an identifier of the next transferring unit. A switch in the next transferring unit receives the data packet through the bus, and sends the data packet to the packet processor, the packet processor determines a next transferring unit (that is, a next transferring unit corresponding to the next transferring unit) based on the foregoing principle, and sends information about the next transferring unit and the data packet that are determined by the packet processor to the switch, so that the switch continues to forward the data packet before the data carried in the data packet is forwarded to the destination unit. The destination unit is the switch unit bound to the send port. A switch in the destination unit sends the data to the outside of the networking processor through the send port. Specifically, the switch in the destination unit sequentially sends the data to a packet processor and an access controller in the destination unit for corresponding processing, and then sends the data from the send port.

If the transmission path of the data is determined in the second manner:

The access controller is configured to obtain a data packet carrying the data from the outside of the networking processor and send the data packet carrying the data to the outside of the networking processor through a port bound to the switch unit to which the access controller belongs. The packet processor is configured to: obtain the data packet from the access controller (that is, the switch unit is the switch unit bound to the receive port); obtain a destination address from the data packet; determine a send port in the plurality of ports based on the destination address; determine a destination unit based on the send port; and determine, based on the destination unit, path information for forwarding the data to the destination unit. The destination unit is the switch unit bound to the send port.

When the switch obtains the path information and the data from the packet processor, that is, the switch unit is the switch unit bound to the receive port, the switch is configured to send the data and the path information to a transferring unit based on the path information through the bus, so that the transferring unit continues to forward the data and the path information based on the path information before the data is forwarded to the destination unit.

When the switch obtains, from the bus, the data and the path information that are forwarded by another switch unit or the transferring unit, that is, the switch unit is the transferring unit, the switch is configured to continue to forward the data and the path information based on the path information before the data is forwarded to the destination unit. The path information indicates information about the transferring unit through which the data is forwarded to the destination unit, and the transferring unit is a switch unit that is in the plurality of switch units and that is configured to forward the data. The information about the transferring unit indicates an identifier of the transferring unit and a sequence between the transferring units.

Structures of the access controller and the packet processor are described above, and details are not described herein again.

Based on this, a principle of data switching between the ports on the networking processor is as follows:

The receive port receives the data packet carrying the data from the outside of the networking processor, and sends the data packet to the switch unit bound to the receive port. The access controller in the switch unit obtains the data packet, and sends the data packet to the packet processor in the switch unit. The packet processor determines, based on the destination address in the data packet and with reference to the foregoing principle, the path information about sending the data to the destination unit, and sends the path information and the data to the switch in the switch unit. The switch sends the data and the path information to a transferring unit adjacent to the switch unit based on the path information through the bus. A switch in the transferring unit receives the path information and the data, and continues to forward the data and the path information to a next transferring unit based on the path information before the data is forwarded to the destination unit. A switch in the destination unit receives the data and sends the data to the outside of the networking processor through the send port. Specifically, the switch in the destination unit sequentially sends the data to a packet processor and an access controller in the destination unit for corresponding processing, and then sends the data from the send port.

Further, the switch unit is further configured to share packet processors in different switch units through the network formed by the plurality of buses. In this way, when performing complex processing on the data packet, the packet processor in the switch unit may request a packet processor in another switch unit to perform assistance processing, thereby improving a processing speed. In addition, because the packet processor in the another switch unit may be requested to perform assistance processing, complexity of processing the data packet by a packet processor in each switch unit is reduced.

It can be learned from the foregoing that, by sharing the packet processors in the switch units, processing capabilities of the packet processors in the networking processor can be integrated, so that a capability of supporting a complex service is greatly enhanced, and in a case in which complexity of services that need to be supported is the same, a processing amount and processing complexity of each packet processor are reduced, and a functional requirement on each packet processor is reduced.

It should be noted that, a structure of the foregoing switch unit is merely an example, and is not intended to limit the present disclosure. For example, based on the structure of the foregoing switch unit, the switch unit may further include a traffic manager and/or a first buffer. The traffic manager is configured to write the data into a corresponding queue based on an attribute of the data, and schedule the data in the queue. The first buffer is configured to buffer the data to be forwarded. The switch is further configured to forward the data based on scheduling information of the traffic manager for the data. The scheduling information indicates whether to forward the data and traffic used when forwarding the data. The switch is further configured to temporarily store the received data in the first buffer, so as to obtain the data from the first buffer when the data needs to be invoked.

Further, the switch unit is further configured to share first buffers in different switch units through the network formed by the plurality of buses. In this way, when the first buffer in the switch unit is full, the data can be temporarily stored in a first buffer in another switch unit through the network. When the data needs to be forwarded, the temporarily stored data is obtained from the another switch unit through the bus, and the data is forwarded. Alternatively, when the data needs to be forwarded, a forwarding request is sent to another switch unit, so that the another switch unit forwards the data.

To implement traffic management and scheduling between the plurality of switch units, and transmit the data better, the traffic manager in the switch unit is further configured to obtain, through the network formed by the plurality of buses, a data transmission scheduling request sent by another switch unit, and generate scheduling response information, so that the another switch unit schedules the data based on the scheduling response information. The data transmission scheduling request is used to request whether data can be forwarded, and the scheduling response information indicates whether the switch unit is allowed to forward data, and information such as the traffic used when forwarding the data.

In another possible implementation, the networking processor may further include a second buffer and/or a forwarding table. Both the second buffer and the forwarding table are connected to the switch unit through the bus. The second buffer is configured to buffer data obtained by the switch unit. The forwarding table indicates port information used during communication between the networking processors.

It should be noted that, when the send port is determined based on the destination address, the send port needs to be determined based on the forwarding table.

The second buffer may be arranged in an array with the plurality of switch units. The second buffer may be, for example, located at a middle position of the array, or may be arranged based on a service requirement. This is not specifically limited in this embodiment.

The forwarding table and the plurality of switch units in the networking processor may be arranged in an array. The forwarding table may be, for example, located at a middle position of the array, or may be set based on a service requirement (for example, the forwarding table is arranged near a switch unit that needs to frequently access the forwarding table). This is not specifically limited in this embodiment.

To further expand a storage capability of the networking processor, a switch in each switch unit in the networking processor may further access an external buffer through the bus, to temporarily store the data in the external buffer.

To further increase a capacity of the forwarding table, the switch in each switch unit in the networking processor may further access an external forwarding table through the bus.

To reduce pressure brought by the data packet to the destination unit and/or relieve congestion of the send port, before the switch in the switch unit bound to the receive port sends the data packet to the switch in the destination unit through the bus, the method further includes: The switch in the switch unit bound to the receive port sends a transmission request to the switch in the destination unit through the bus. In response to the transmission request, the switch in the destination unit returns, through the bus based on information such as a quantity of data packets to be currently processed and a quantity of received transmission requests, transmission response information to the switch in the switch unit bound to the receive port. The transmission response information indicates whether the switch in the switch unit bound to the receive port is allowed to send the data packet. The switch in the switch unit bound to the receive port receives the transmission response information. If the transmission response information indicates that the switch in the switch unit bound to the receive port sends the data packet, the switch in the switch unit bound to the receive port sends the data packet to the switch in the destination unit through the bus. If the transmission response information indicates that the switch in the switch unit bound to the receive port is not allowed to send the data packet, the switch in the switch unit bound to the receive port does not send the data packet.

It should be noted that, transmission of other information between different switch units (that is, information other than the data packet, such as a transmission request and an authorization instruction) and transmission of the data packet between different units may share a same bus, or may separately use respective buses.

The following describes a structure of the networking processor by using an example.

Figure 2:
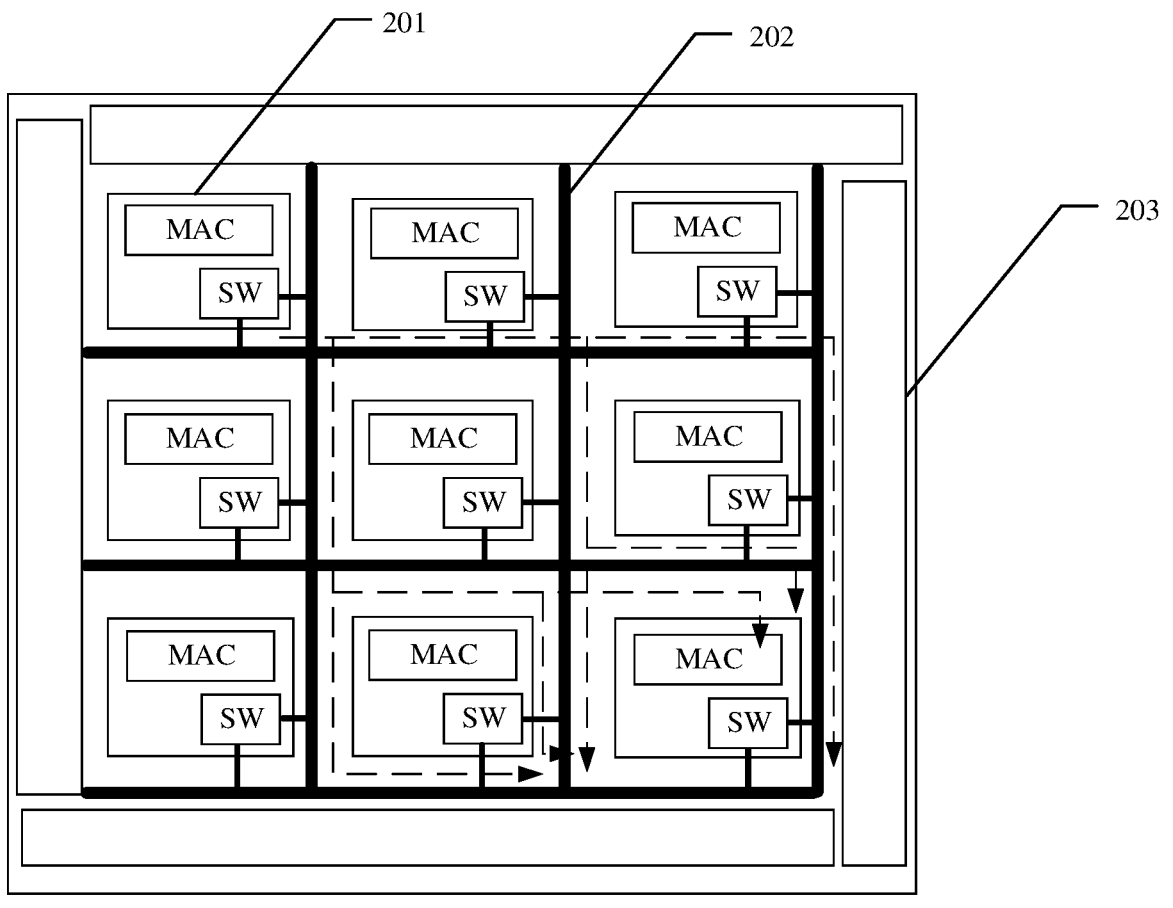
FIG. 2 is a schematic diagram 1 of a structure of a networking processor according to an embodiment of the present disclosure.

FIG. 2 is a schematic diagram 1 of a structure of a networking processor according to an embodiment of the present disclosure. In FIG. 2, an example in which the access controller is a media access controller is used.

As shown in FIG. 2, the networking processor includes nine switch units 201, six buses 202, and a plurality of ports 203, and each switch unit includes a switch (SW) and a media access controller (MAC). The nine switch units 201 are arranged into three rows and three columns, and the six buses 202 are arranged into three rows and three columns and distributed around each switch unit. Switches (SW) in switch units 201 in row i are connected to a bus 202 in row i, switches (SW) in switch units 201 in column j are connected to a bus 202 in column j, and the plurality of ports 203 is distributed around the nine switch units 201. It should be noted that, there is no intersection point between different buses.

If data is switched between a port bound to a switch unit 201 in the upper left corner of the networking processor and a port bound to a switch unit 201 (that is, the destination unit) in the lower right corner, there may be a plurality of paths for forwarding the data from the switch unit 201 in the upper left corner to the switch unit 201 in the lower right corner. Six of the plurality of paths are drawn by dotted lines. A dotted line represents a path.

Figure 3:
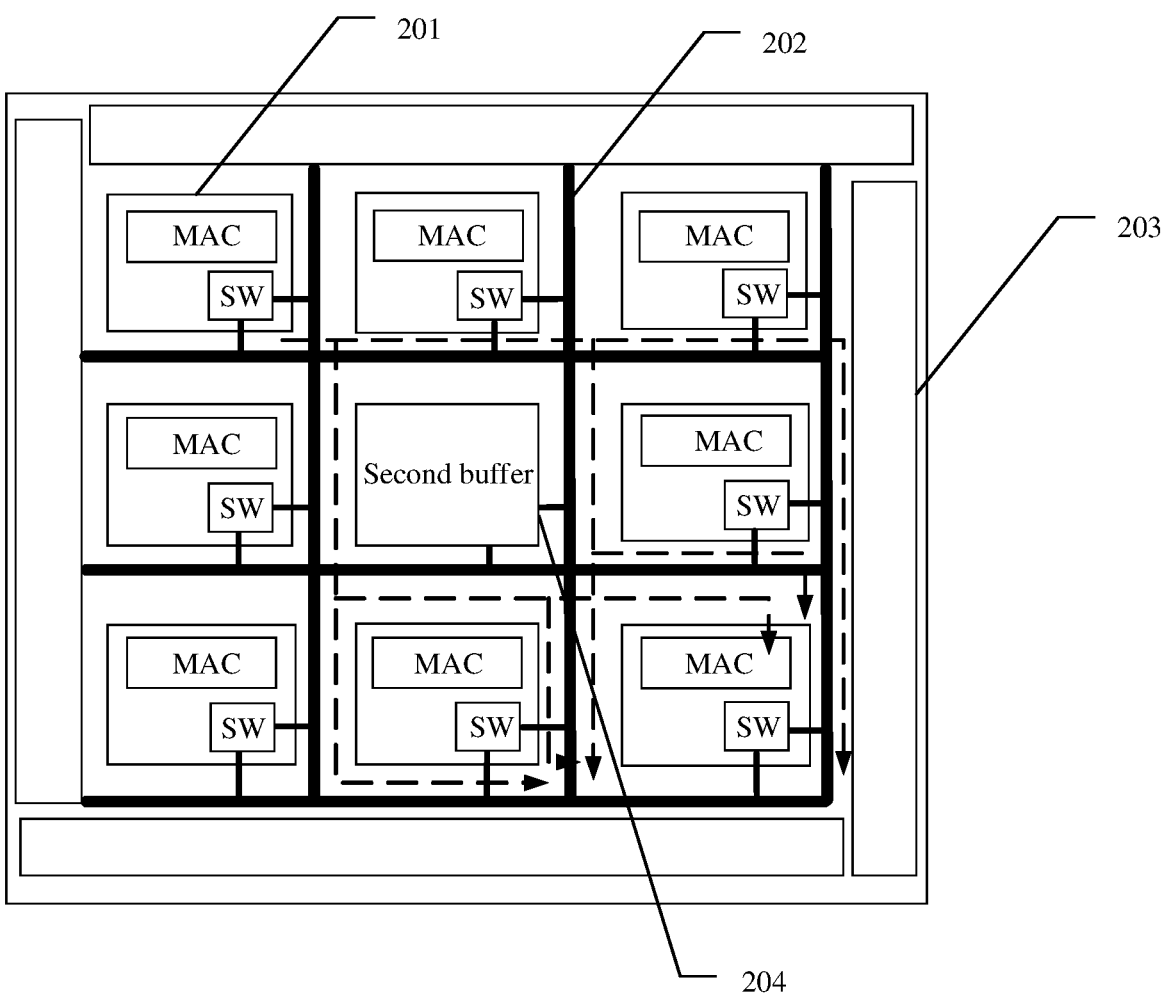
FIG. 3 is a schematic diagram 2 of a structure of a networking processor according to an embodiment of the present disclosure.

FIG. 3 is a schematic diagram 2 of a structure of a networking processor according to an embodiment of the present disclosure. As shown in FIG. 3, a difference between the networking processor in FIG. 3 and the networking processor in FIG. 2 lies in that a switch unit at a middle position is replaced with a second buffer 204, so that a switch unit 201 can buffer data in the second buffer through a bus 202.

Figure 4:
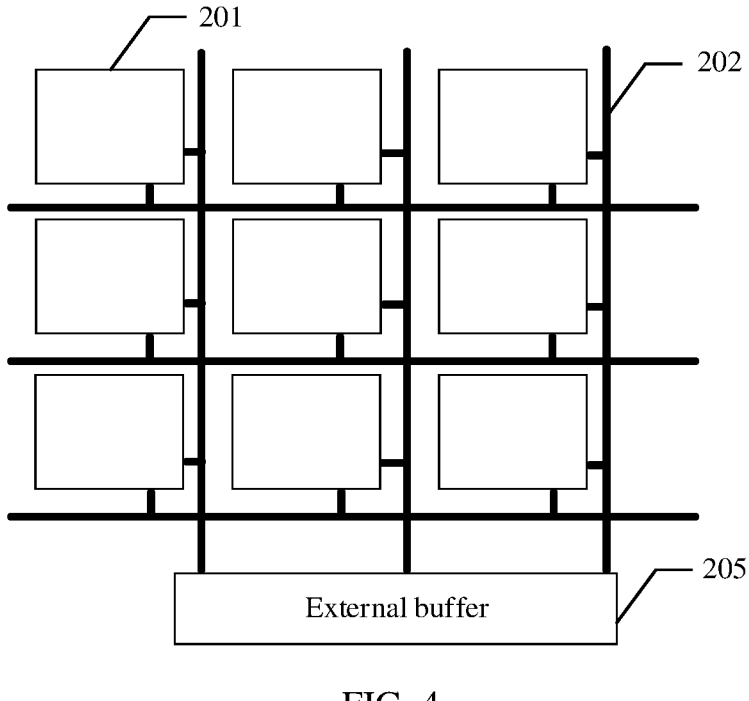
FIG. 4 is a schematic diagram 3 of a structure of a networking processor according to an embodiment of the present disclosure.

FIG. 4 is a schematic diagram 3 of a structure of a networking processor according to an embodiment of the present disclosure. As shown in FIG. 4, quantities and arrangement manners of switch units and buses are the same as those in FIG. 2. The networking processor is configured with an external buffer 205, and the external buffer 205 is connected to a switch unit 201 through a bus 202.

It should be noted that a structure of the switch unit is not shown in FIG. 4, that is, the structure of the switch unit is not limited. In addition, a plurality of ports is not shown in FIG. 4.

Figure 5:
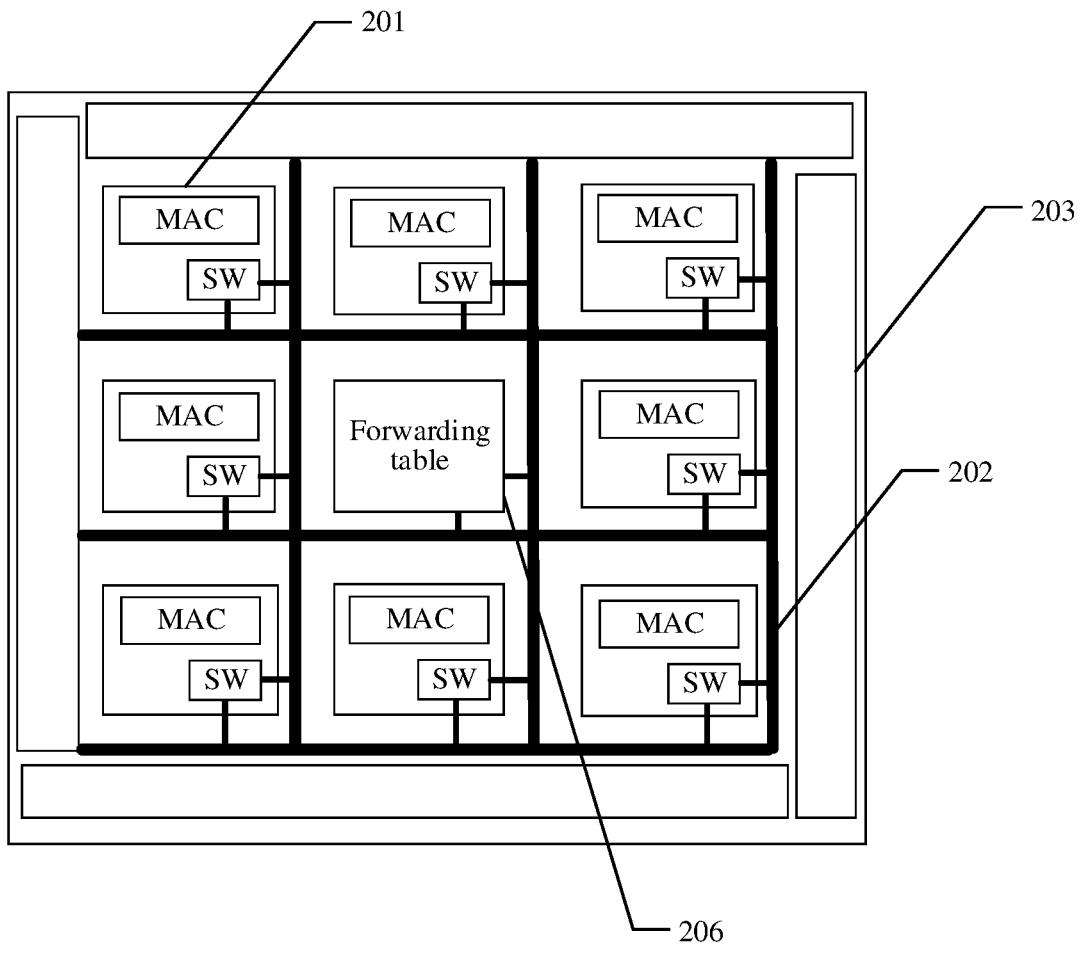
FIG. 5 is a schematic diagram 4 of a structure of a networking processor according to an embodiment of the present disclosure.

FIG. 5 is a schematic diagram 4 of a structure of a networking processor according to an embodiment of the present disclosure. As shown in FIG. 5, a difference between the networking processor in FIG. 5 and the networking processor in FIG. 2 lies in that a switch unit at a middle position is replaced with a forwarding table 206, so that a switch unit 201 can access the forwarding table 206 through a bus 202.

Figure 6:
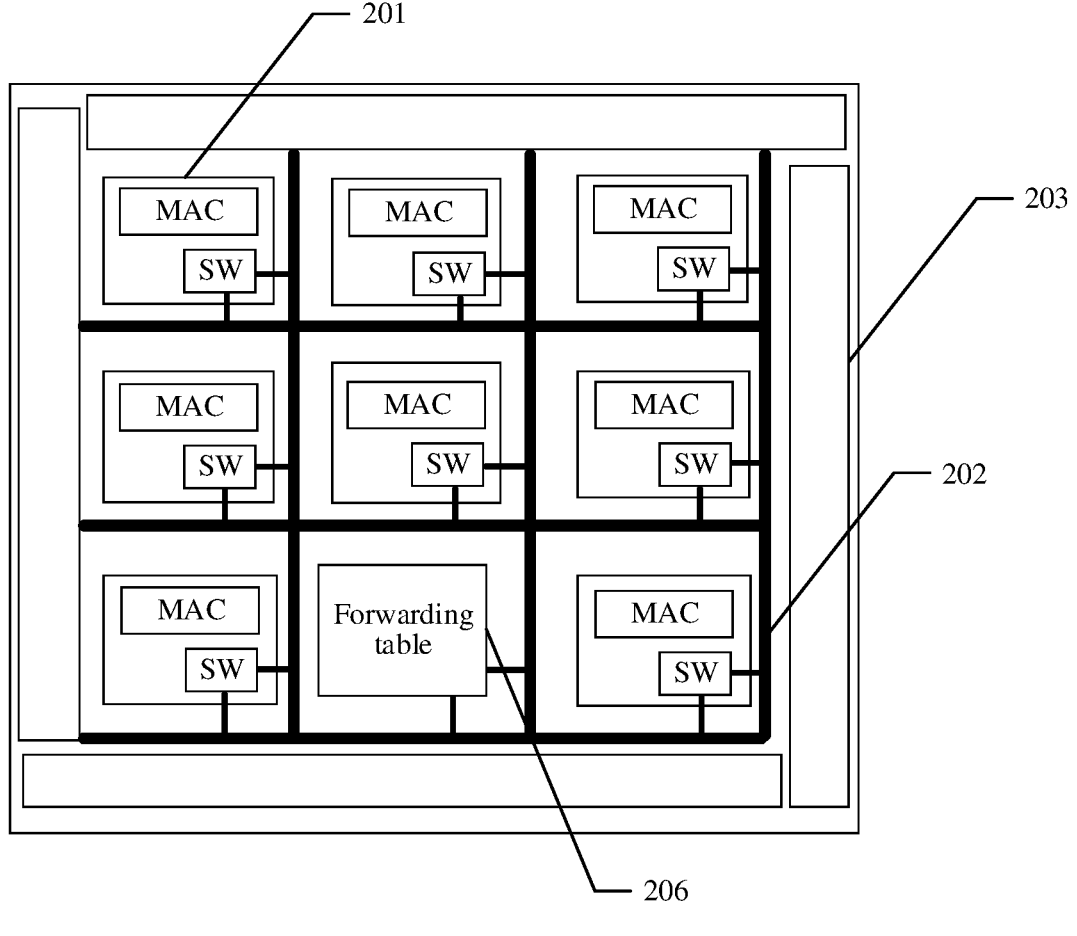
FIG. 6 is a schematic diagram 5 of a structure of a networking processor according to an embodiment of the present disclosure.

FIG. 6 is a schematic diagram 5 of a structure of a networking processor according to an embodiment of the present disclosure. As shown in FIG. 6, a difference between the networking processor in FIG. 6 and the networking processor in FIG. 2 lies in that a switch unit in a third row and a second column is replaced with a forwarding table 206, so that a switch unit 201 can access the forwarding table 206 through a bus 202.

Figure 7:
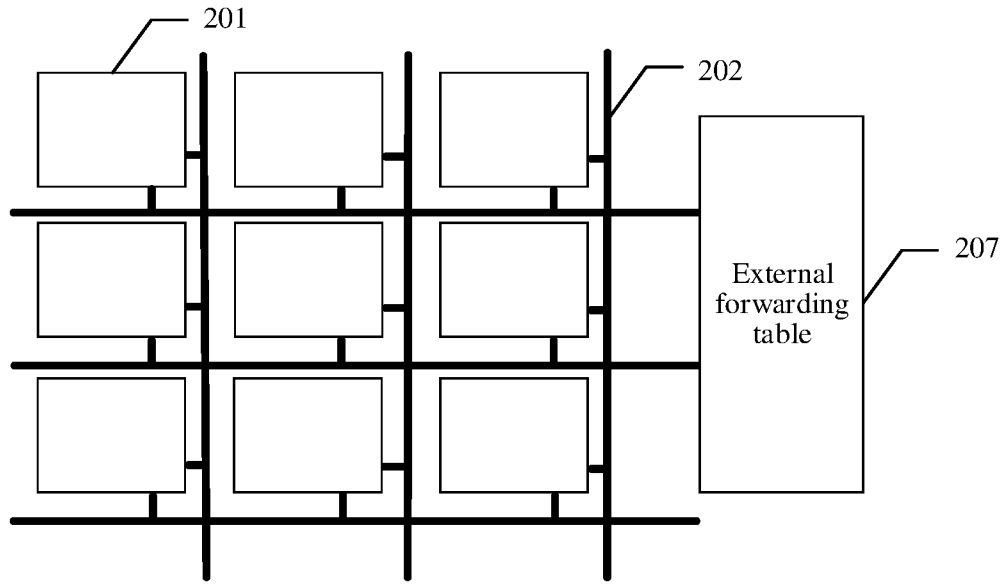
FIG. 7 is a schematic diagram 6 of a structure of a networking processor according to an embodiment of the present disclosure.

FIG. 7 is a schematic diagram 6 of a structure of a networking processor according to an embodiment of the present disclosure. As shown in FIG. 7, quantities and arrangement manners of switch units 201 and buses 202 are the same as those in FIG. 2. The networking processor is configured with an external forwarding table 207, and the external forwarding table 207 is connected to a switch unit 201 through a bus 202.

It should be noted that a structure of the switch unit is not shown in FIG. 7, that is, the structure of the switch unit is not limited. In addition, a plurality of ports is not shown in FIG. 7.

Figure 8:
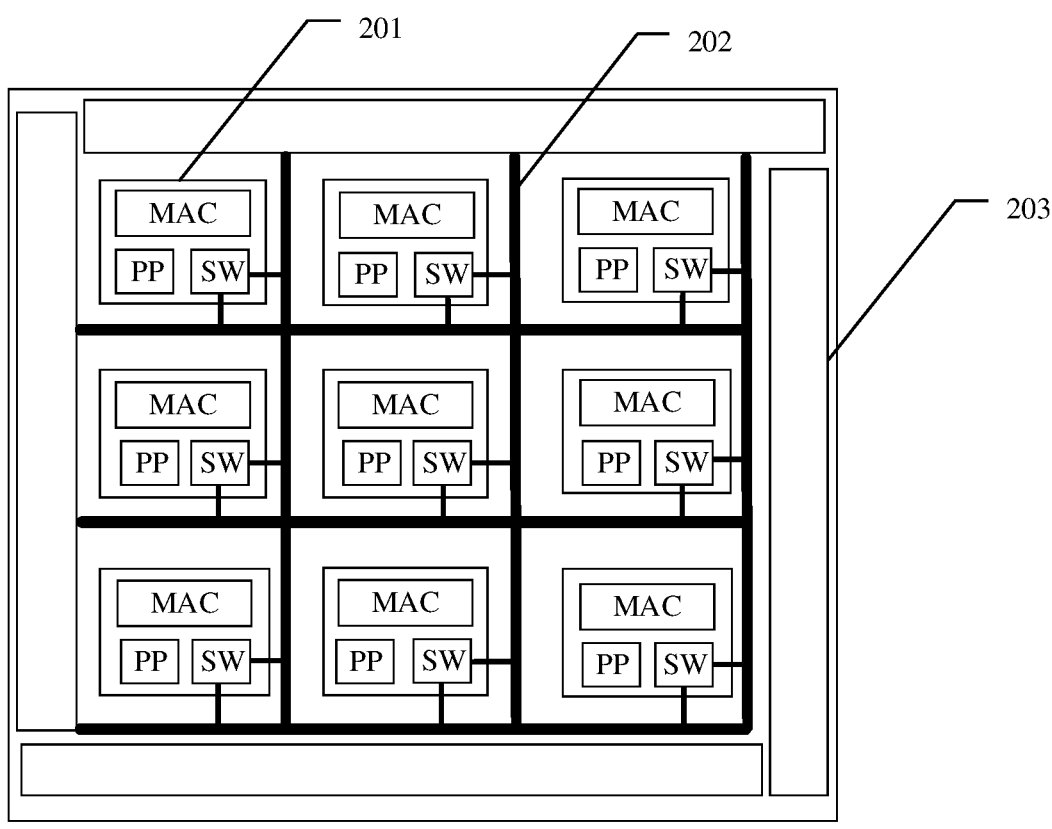
FIG. 8 is a schematic diagram 7 of a structure of a networking processor according to an embodiment of the present disclosure.

FIG. 8 is a schematic diagram 7 of a structure of a networking processor according to an embodiment of the present disclosure. A difference between the networking processor in FIG. 8 and the networking processor in FIG. 2 lies in that a switch unit 201 further includes a packet processor (PP).

Figure 9:
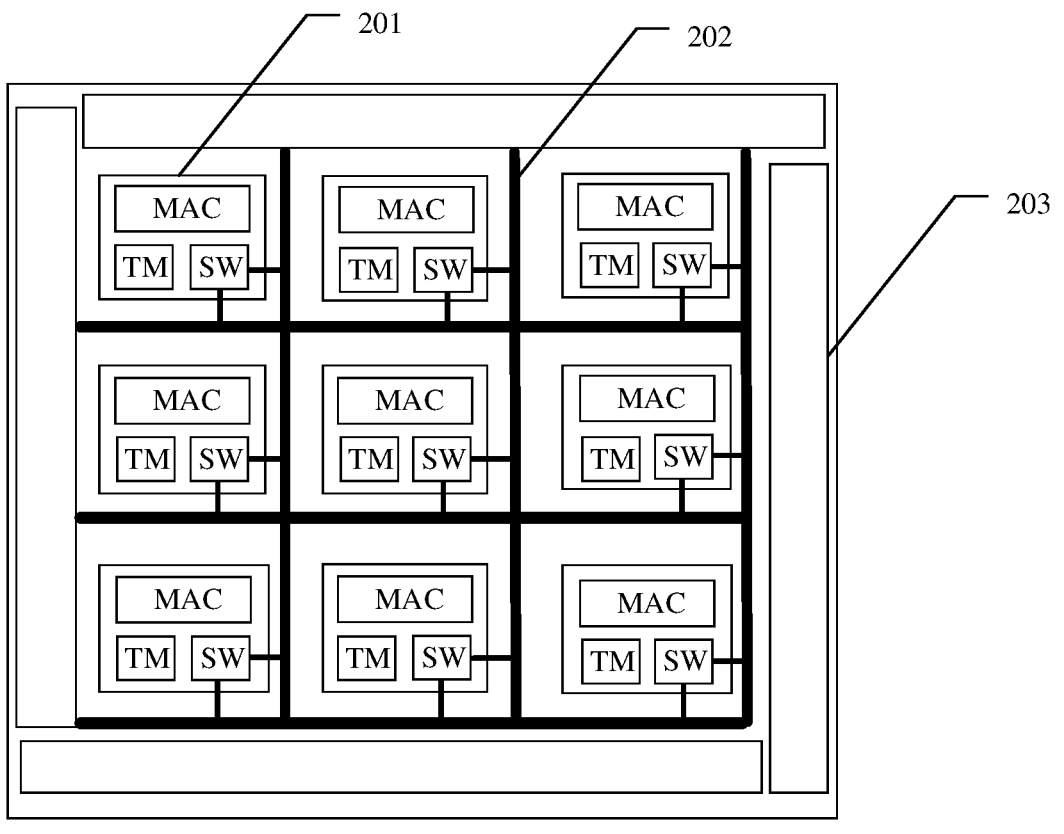
FIG. 9 is a schematic diagram 8 of a structure of a networking processor according to an embodiment of the present disclosure.

FIG. 9 is a schematic diagram 8 of a structure of a networking processor according to an embodiment of the present disclosure. A difference between the networking processor in FIG. 9 and the networking processor in FIG. 2 lies in that a switch unit 201 further includes a traffic scheduler (TM).

Figure 10:
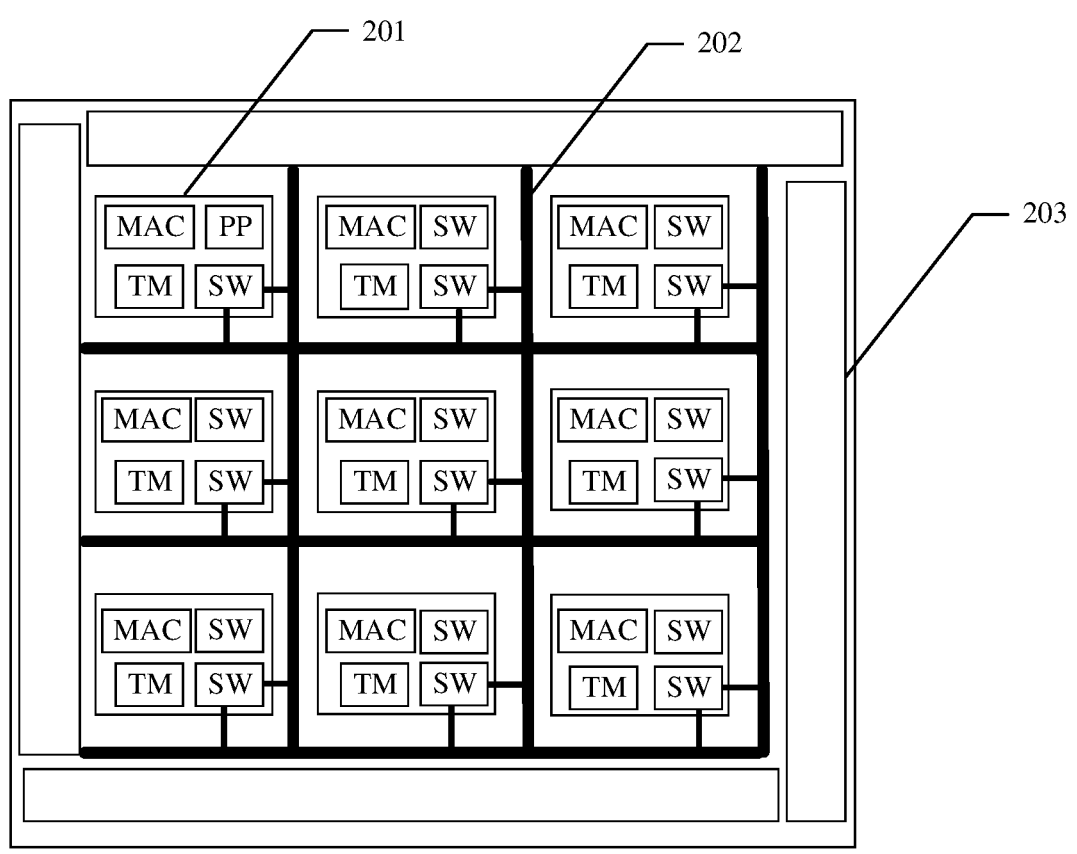
FIG. 10 is a schematic diagram 9 of a structure of a networking processor according to an embodiment of the present disclosure.

FIG. 10 is a schematic diagram 9 of a structure of a networking processor according to an embodiment of the present disclosure. A difference between the networking processor in FIG. 10 and the networking processor in FIG. 2 lies in that a switch unit 201 further includes a traffic scheduler (TM) and a packet processor (PP).

An embodiment of the present disclosure further provides a network device, and the network device includes at least one of the foregoing networking processors. The at least one networking processor is interconnected through a bus. The network device may be a device such as a server. This is not specifically limited in this embodiment.

The foregoing descriptions are merely specific implementations of the present disclosure, but the protection scope of the present disclosure is not limited thereto. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A networking processor, comprising a plurality of ports, a plurality of buses and a plurality of switch units, wherein
   each of the plurality of switch units is bound to at least one of the plurality of ports, and is configured to receive data from outside of the networking processor and send the data to the outside of the networking processor through a bound port; and
   each of the plurality of buses is bound to at least two of the plurality of switch units, each of the plurality of switch units is bound to at least one of the plurality of buses, and the switch unit forwards the data between different switch units in the plurality of switch units through a network formed by the plurality of buses,
   wherein each of the plurality of switch units comprises a switch, an access controller, and a packet processor, wherein
   the access controller is configured to obtain a data packet carrying the data from the outside of the networking processor and send the data packet carrying the data to the outside of the networking processor through a port bound to the switch unit to which the access controller belongs;
   the packet processor is configured to: obtain the data packet from the access controller; obtain a destination address from the data packet; determine a send port in the plurality of ports based on the destination address; determine a destination unit based on the send port; and determine, based on the destination unit, path information for forwarding the data to the destination unit;
   when the switch obtains the path information and the data from the packet processor, the switch is configured to send the data and the path information to a transferring unit based on the path information through at least one of the plurality of buses, so that the transferring unit continues to forward the data and the path information based on the path information before the data is forwarded to the destination unit; and
   when the switch obtains, from at least one of the plurality of buses, the data and the path information that are forwarded by another switch unit or the transferring unit, the switch is configured to continue to forward the data and the path information based on the path information before the data is forwarded to the destination unit, wherein
   the path information indicates information about the transferring unit through which the data is forwarded to the destination unit, and the transferring unit is a switch unit that is in the plurality of switch units and that is configured to forward the data.

2. The networking processor according to claim 1, wherein the switch unit is further configured to share packet processors in different switch units through the network formed by the plurality of buses.

3. The networking processor according to claim 1, wherein the switch unit further comprises a traffic manager and/or a first buffer, wherein
   the traffic manager is configured to write the data into a corresponding queue based on an attribute of the data, and schedule the data in the corresponding queue;
   the first buffer is configured to buffer the data; and
   the switch is further configured to forward the data based on scheduling information of the traffic manager for the data.

4. The networking processor according to claim 3, wherein the switch unit is further configured to share first buffers in different switch units through the network formed by the plurality of buses.

5. The networking processor according to claim 3, wherein the traffic manager in the switch unit is further configured to obtain, through the network formed by the plurality of buses, a data transmission scheduling request sent by another switch unit, and generate scheduling response information, so that the another switch unit schedules the data based on the scheduling response information.

6. The networking processor according to claim 1, further comprising a second buffer and/or a forwarding table, wherein
   both the second buffer and the forwarding table are connected to the plurality of switch units through the plurality of buses;
   the second buffer is configured to buffer data obtained by the plurality of switch units; and
   the forwarding table indicates port information used during communication between networking processors.

7. A network device, comprising at least one networking processor interconnected through one or more buses, each of the at least one networking processor comprising a plurality of ports, a plurality of buses and a plurality of switch units, wherein
   each of the plurality of switch units is bound to at least one of the plurality of ports, and is configured to receive data from outside of the networking processor and send the data to the outside of the networking processor through a bound port; and each of the plurality of buses is bound to at least two of the plurality of switch units, each of the plurality of switch units is bound to at least one of the plurality of buses, and the switch unit forwards the data between different switch units in the plurality of switch units through a network formed by the plurality of buses, wherein each of the plurality of switch units comprises a switch, an access controller, and a packet processor, wherein the access controller is configured to obtain a data packet carrying the data from the outside of the networking processor and send the data packet carrying the data to the outside of the networking processor through a port bound to the switch unit to which the access controller belongs;

the packet processor is configured to: obtain the data packet from the access controller; obtain a destination address from the data packet; determine a send port in the plurality of ports based on the destination address; determine a destination unit based on the send port; and determine, based on the destination unit, path information for forwarding the data to the destination unit;

when the switch obtains the path information and the data from the packet processor, the switch is configured to send the data and the path information to a transferring unit based on the path information through at least one of the plurality of buses, so that the transferring unit continues to forward the data and the path information based on the path information before the data is forwarded to the destination unit; and when the switch obtains, from at least one of the plurality of bases, the data and the path information that are forwarded by another switch unit or the transferring unit, the switch is configured to continue to forward the data and the path information based on the path information before the data is forwarded to the destination unit, wherein the path information indicates information about the transferring unit through which the data is forwarded to the destination unit, and the transferring unit is a switch unit that is in the plurality of switch units and that is configured to forward the data.

8. The network device according to claim 7, wherein the switch unit is further configured to share packet processors in different switch units through the network formed by the plurality of buses.

9. The network device according to claim 7, wherein the switch unit further comprises a traffic manager and/or a first buffer, wherein the traffic manager is configured to write the data into a corresponding queue based on an attribute of the data, and schedule the data in the corresponding queue;

the first buffer is configured to buffer the data; and the switch is further configured to forward the data based on scheduling information of the traffic manager for the data.

10. The network device according to claim 9, wherein the switch unit is further configured to share first buffers in different switch units through the network formed by the plurality of buses.

11. The network device according to claim 9, wherein the traffic manager in the switch unit is further configured to obtain, through the network formed by the plurality of buses, a data transmission scheduling request sent by another switch unit, and generate scheduling response information, so that the another switch unit schedules the data based on the scheduling response information.

12. The network device according to claim 7, further comprising a second buffer and/or a forwarding table, wherein both the second buffer and the forwarding table are connected to the plurality of switch units through the plurality of buses;

the second buffer is configured to buffer data obtained by the plurality of switch units; and the forwarding table indicates port information used during communication between networking processors.

13. A networking processor, comprising a plurality of ports, a plurality of buses and a plurality of switch units, wherein each of the plurality of switch units is bound to at least one of the plurality of ports, and is configured to receive data from outside of the networking processor and send the data to the outside of the networking processor through a bound port; and each of the plurality of buses is bound to at least two of the plurality of switch units, each of the plurality of switch units is bound to at least one of the plurality of buses, and the switch unit forwards the data between different switch units in the plurality of switch units through a network formed by the plurality of buses, wherein each of the plurality of switch units comprises a switch and an access controller, wherein the access controller is configured to obtain a data packet carrying the data from the outside of the networking processor and send the data packet carrying the data to the outside of the networking processor through a port bound to the switch unit to which the access controller belongs;

when the switch obtains the data packet from the access controller, the switch is configured to: obtain a destination address from the data packet; determine a send port based on the destination address; determine a destination unit based on the send port; determine, based on the destination unit, path information for forwarding the data to the destination unit; and send the data and the path information to a transferring unit based on the path information through at least one of the plurality of buses, so that the transferring unit continues to forward the data and the path information based on the path information before the data is forwarded to the destination unit; and when the switch obtains, from at least one of the plurality of buses, the data and the path information that are forwarded by another switch unit or the transferring unit, the switch is configured to continue to forward the data and the path information based on the path information before the data is forwarded to the destination unit, wherein the path information indicates information about the transferring unit through which the data is forwarded to the destination unit, and the transferring unit is a switch unit that is in the plurality of switch units and that is configured to forward the data.

* * * * *